(12) United States Patent
Hadas et al.

(10) Patent No.: US 8,131,833 B2
(45) Date of Patent: Mar. 6, 2012

(54) MANAGING COMMUNICATION BETWEEN NODES IN A VIRTUAL NETWORK

(75) Inventors: David Hadas, Zichron Yaakov (IL); Irit Loy, Bet Hanania (IL); Benny Rochwerger, Zichron Yaakov (IL); Julian Satran, Atlit (IL)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 12/623,327

(22) Filed: Nov. 20, 2009

(65) Prior Publication Data
US 2011/0125887 A1    May 26, 2011

(51) Int. Cl.
*G06F 15/16* (2006.01)
(52) U.S. Cl. .......... 709/223; 709/204; 709/229
(58) Field of Classification Search .......... 709/223
See application file for complete search history.

(56) References Cited

U.S. PATENT DOCUMENTS

| | | | |
|---|---|---|---|
| 2003/0182421 A1* | 9/2003 | Faybishenko et al. | 709/224 |
| 2005/0238035 A1* | 10/2005 | Riley | 370/401 |
| 2009/0248846 A1* | 10/2009 | Cohn | 709/223 |

* cited by examiner

*Primary Examiner* — Wing Chan
*Assistant Examiner* — Andrew Woo
(74) *Attorney, Agent, or Firm* — Jason Far-Hadian

(57) ABSTRACT

A method for managing communication between nodes in a virtual network is provided. A first computing system utilizes first information to forward first data to the second computing system in a physical network. If the first information is incorrect, the second computing system forwards an unlearning request to the first computing system, and the first computing system updates or deletes the first information. If the first information is not available, the first computing system forwards the first data to a group of computing systems in the physical network by way of a multicast service. Upon receiving the first data, the second computing system or a third computing system in the physical network forwards a learning request to the first computing system, and the first computing system utilizes the learning request to generate the first information.

23 Claims, 9 Drawing Sheets

MANAGING COMMUNICATION BETWEEN NODES IN A VIRTUAL NETWORK

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of the claimed subject matter to material associated with such marks.

TECHNICAL FIELD

The claimed subject matter relates generally to cloud computing and, more particularly, to managing communication between nodes in a virtual network.

BACKGROUND

Cloud computing refers to a computing paradigm in which one or more services (e.g., resources) are provided such that a service request may be submitted without having knowledge of one or more hardware infrastructures supporting the service (e.g., host machines). Such services may include virtual computing services and virtual connectivity services. A set of virtual computing services, or a virtual machine (VM), is managed by host software that emulates, or virtualizes, physical computing resources of a host machine. A set of virtual connectivity services, or a virtual network, is managed by host software that virtualizes the physical connectivity resources of a host machine.

In existing implementations, a VM is referenced using a physical address of the physical network (e.g. a VLAN according to IEEE 802.1Q) to which its respective host machine is connected. Consequently, the VM is associated with the physical location of its physical machine. Unfortunately, such association to a physical location prevents the VM from being freely migrateable to a different host machine. Dependence on a physical location also prevents the virtual network as a whole from being freely migrateable to a different network environment.

SUMMARY

The present disclosure is directed to systems and corresponding methods that facilitate managing communication between nodes in a virtual network.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for managing communication between nodes in a virtual network is provided. A first computing system utilizes first information to forward first data to the second computing system in a physical network. If the first information is incorrect, the second computing system forwards an unlearning request to the first computing system, and the first computing system updates or deletes the first information. If the first information is not available, the first computing system forwards the first data to a group of computing systems in the physical network by way of a multicast service. Upon receiving the first data, the second computing system or a third computing system in the physical network forwards a learning request to the first computing system, and the first computing system utilizes the learning request to generate the first information.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Figure 1A:
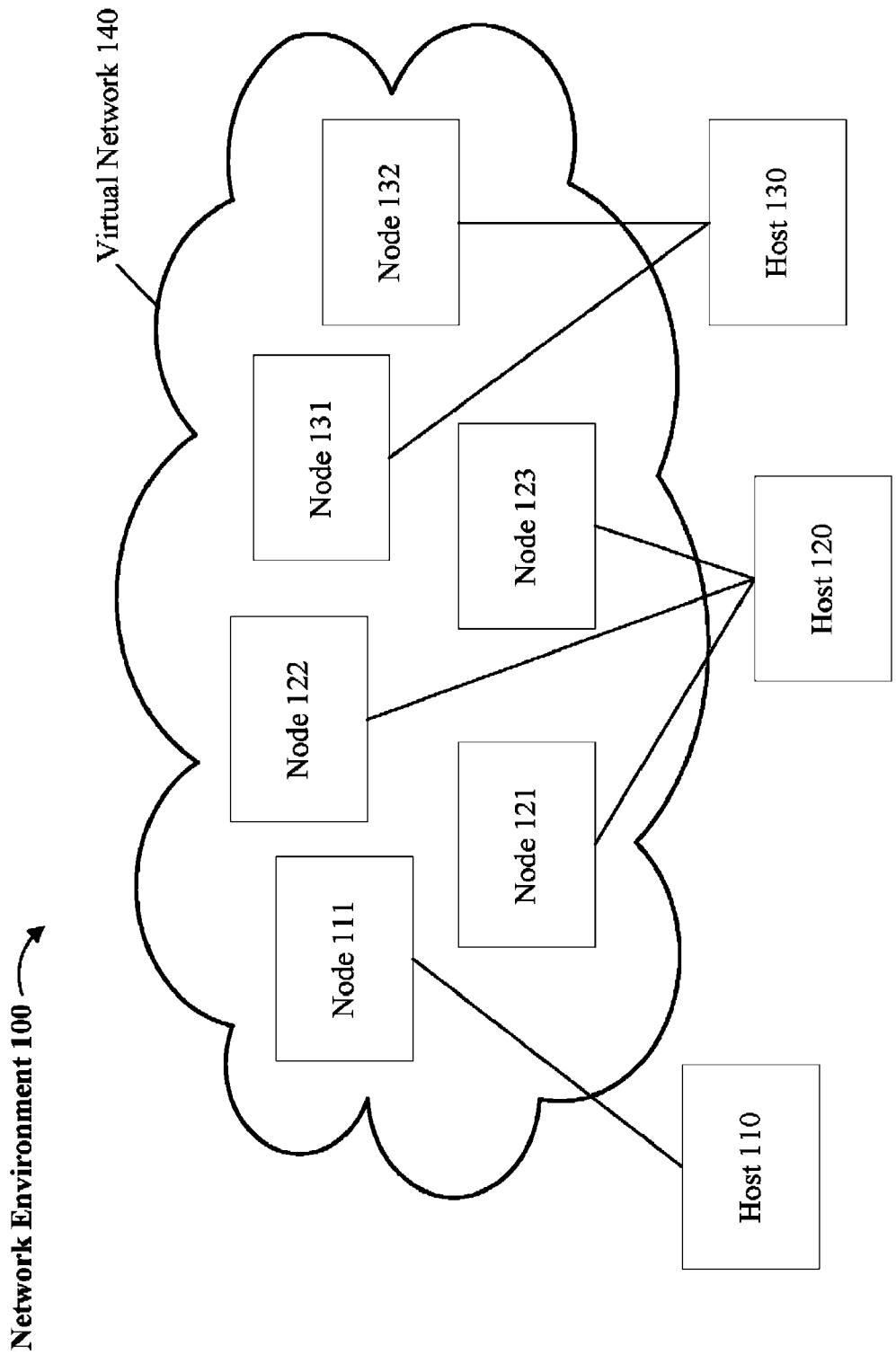
FIGS. 1A and 1B illustrate an exemplary network environment comprising a virtual network, in accordance with one or more embodiments.

Referring to FIG. 1A, in accordance with one or more embodiments, an exemplary network environment 100 comprises one or more host machines (e.g., hosts 110, 120, 130) and a virtual network 140. The hosts may individually or collaboratively serve the virtual network 140 to one or more VMs running on the host machines to provide connectivity between the VMs. As used herein, connectivity refers to the capability to communicate data between at least two VMs.

The hosts may provide connectivity between the VMs by managing communication between respective virtual network interfaces (i.e., nodes) of the VMs. For example, host 110 may manage forwarding or receiving of data by node 111 of a first VM (not shown). Host 120 may manage forwarding or receiving of data by nodes 121, 122, and 123 of second, third, and fourth VMs (not shown), respectively. And, host 130 may manage forwarding or receiving of data by nodes 131 and 132 of fifth and sixth VMs (not shown), respectively.

It is noteworthy that one or more intermediate hosts (not shown) may also serve the VMs. An intermediate host refers to a host that serves the virtual network 140 to one or more VMs residing on another host. Also, in one embodiment, a VM may have a single virtual network interface for a virtual network. In other embodiments, a VM may have multiple virtual network interfaces for different virtual networks.

Figure 1B:
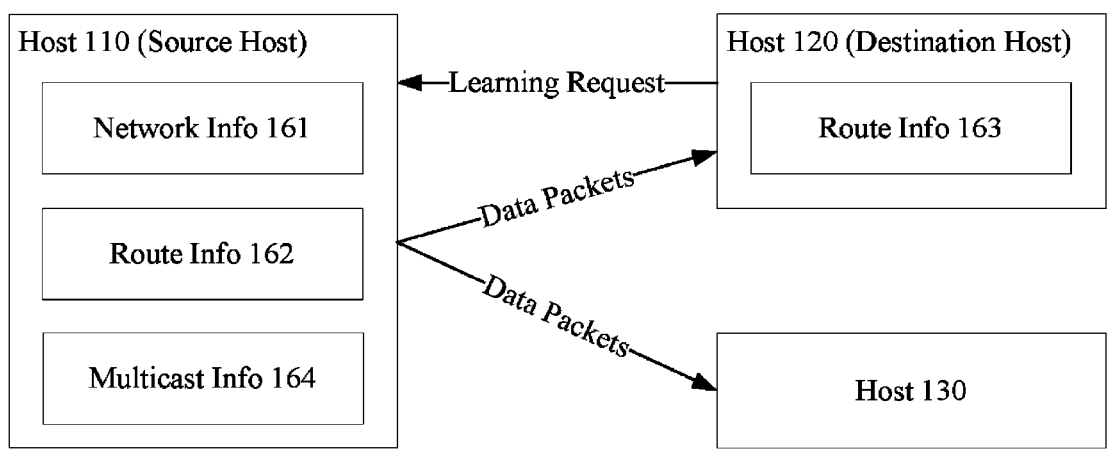

Referring to FIGS. 1A and 1B, in accordance with one or more embodiments, the hosts may utilize network information, route information, or multicast information to manage communication between the nodes in the virtual network 140. Route information refers to information learned by a host for forwarding a data packet from a source to a destination. In one implementation, route information may associate a node with the location of a host. Network information refers to information associating a node with a virtual network to which the node is an interface.

For example, if source host 110 receives a data packet from source node 111, source host 110 may utilize network information 161 to determine that source node 111 is an interface to the virtual network 140. Source host 110 may utilize route information 162 to forward the data packet to destination host 120. When destination host 120 receives the data packet from source host 110, destination host 120 may utilize route information 163 to forward the data packet to destination node 121 or to another host. It is noteworthy that a destination host may forward a data packet to another host instead of a node if the destination host is an intermediate host.

A source host may generate, update, or delete network information, in response to node creation, migration, or destruction. For example, host 110 may generate network information 161, in response to creation of node 111. A source host may generate, update, or delete route information, in response to receiving a learning or unlearning request from a destination host. For example, source host 110 may generate route information 162, in response to receiving a learning request from destination host 120. Source host 110 may update or delete route information 162, in response to receiving an unlearning request from destination host 120. A source host may also generate, update, or delete route information, in response to other events. For example, destination host 120 may generate route information 163, in response to receiving a data packet from source host 110. Source host 110 may update or delete route information 162, in response migration of node 111.

Multicast information refers to information utilized by a source host to forward a data packet to a group of hosts by way of a multicast service (e.g., a broadcast service). A multicast service refers to a communication protocol for forwarding traffic to more than one location in a network. A broadcast service refers to a multicast service that forwards traffic to every destination in a network. In one implementation, multicast information may comprise a multicast address of the physical network connecting the group of hosts.

In another implementation, multicast information may indicate the locations of one or more hosts such that the indicated hosts may receive the multicast information and optionally forward them further to one or more other hosts, where as all hosts in the multicast domain eventually receive the multicast information. A multicast service is therefore a distributed mechanism enabling each host in a multicast domain to receive all multicast information sent by all other hosts in the same multicast domain, either directly or via other hosts (e.g., intermediate hosts).

In one embodiment, a source host may maintain multicast information. For example, source host 110 may maintain multicast information 164. Alternatively, an external manager may configure a single multicast domain (not shown) to forward a data packet to a group of hosts upon request by a source host.

Figure 2:
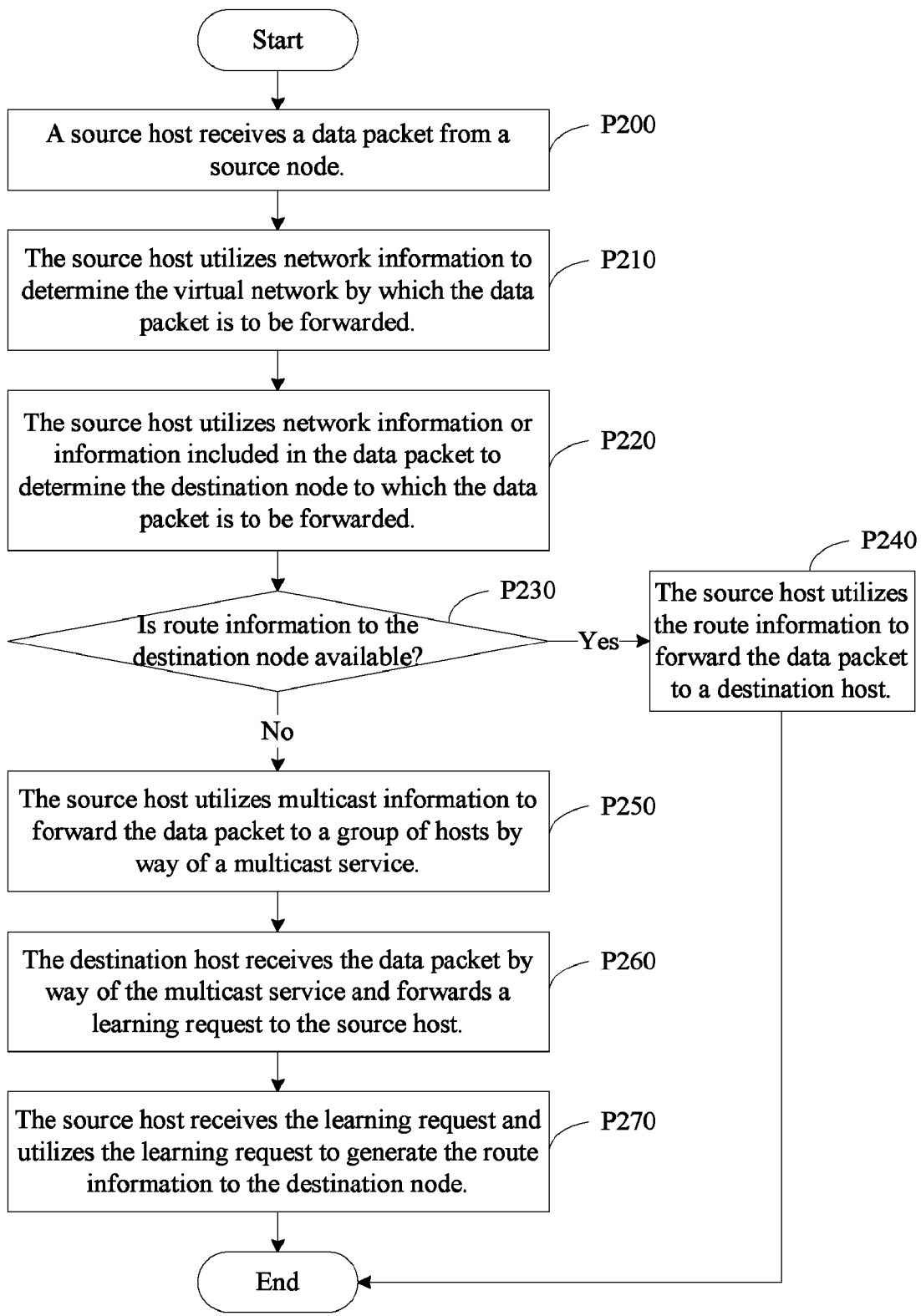
FIG. 2 is a flow diagram of a method for learning route information to a destination node, in accordance with one embodiment.

Referring to FIGS. 1A, 1B, and 2, in accordance with one embodiment, route information may be learned when a source node forwards a data packet to a destination node. For example, source host 110 may receive a data packet from source node 111 (P200). Upon receiving the data packet, source host 110 utilizes network information 161 to determine that the data packet is to be forwarded by way of the virtual network 140 (P210). Additionally, the source host 110 utilizes network information 161 or information included in the data packet to determine that the data packet is to be forwarded to destination node 121 (P220). If route information 162 to destination node 121 is available, source host 110 utilizes route information 162 to forward the data packet to destination host 120 (P230, P240).

If route information 162 is not available, source host 110 utilizes multicast information 164 to forward the data packet to a group of hosts (e.g., destination host 120 and host 130) in the network environment 100 by way of a multicast service (P230, P250). Upon receiving the data packet by way of the multicast service, destination host 120 forwards a learning request to source host 110 (P260). Depending on implementation, the learning request may comprise at least one of an identifier for the virtual network 140, an identifier for a virtual network interface connecting the destination node 121 to the virtual network 140, or the location of destination host 120 in the network environment 100. Upon receiving a data packet, destination host 120 may optionally also generate route information to source node 111.

Upon receiving the learning request from destination host 120, source host 110 utilizes the learning request to generate route information 162 to destination node 121 (P270). It is noteworthy that the processes provided above enable a source node to forward a data packet to a destination node and vice versa without the knowledge of the physical location of the destination node or the virtual network to which the destination node is an interface. As such, the destination node is freely migrateable to different hosts and different virtual networks.

Figure 3:
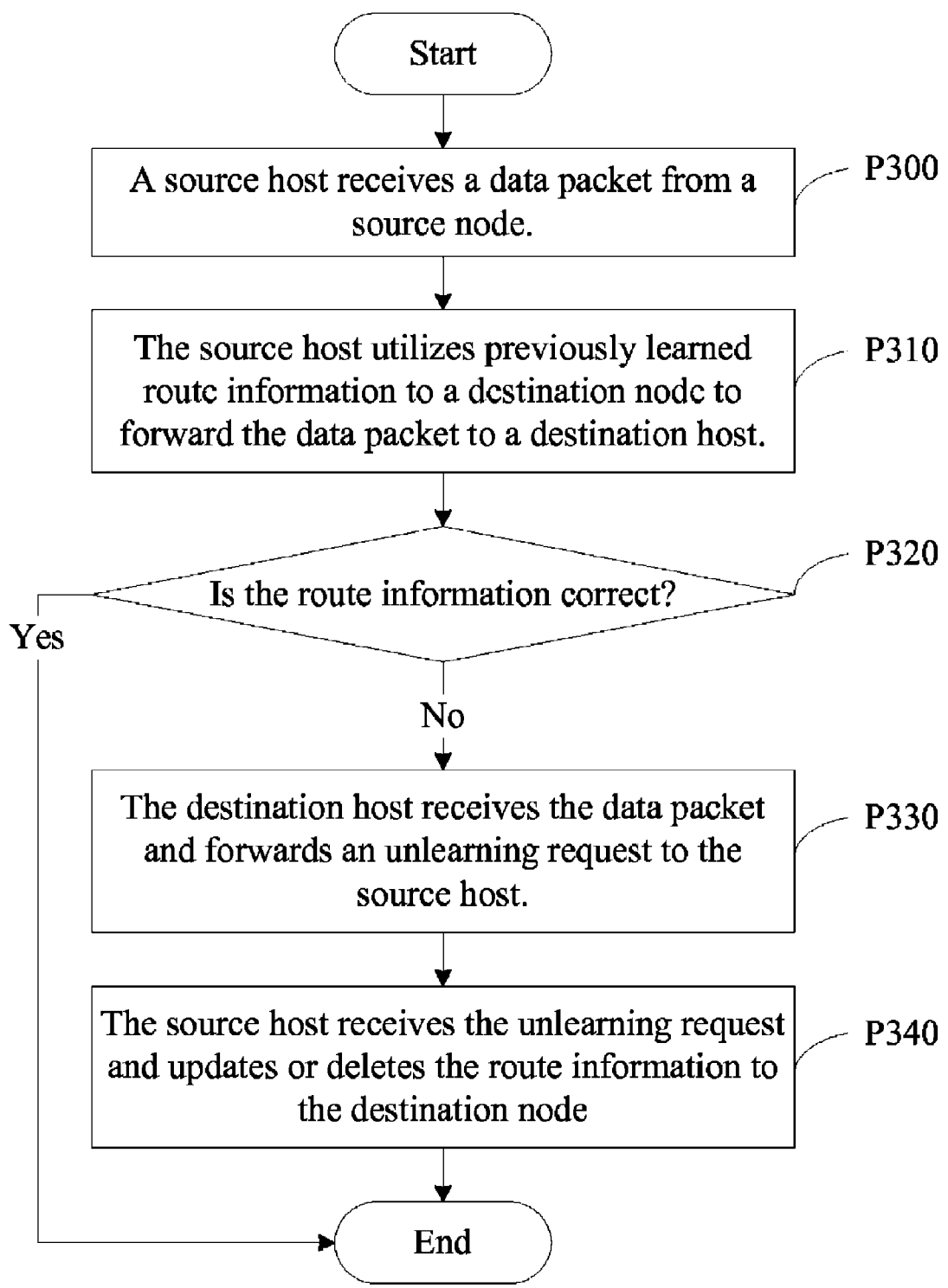
FIG. 3 is a flow diagram of a method for unlearning route information to a destination node, in accordance with one embodiment.

Referring to FIGS. 1A, 1B, and 3, in accordance with one embodiment, route information may be unlearned when a source node forwards a data packet to a destination node. For example, source host 110 may receive a data packet from source node 111 (P300). Upon receiving the data packet, source host 110 utilizes route information 162 to destination node 121, which was previously learned from destination host 120, to forward the data packet to destination host 120 (P310).

If route information 162 is incorrect (i.e., destination host 120 is no longer serving destination node 121), destination host 120 forwards an unlearning request to source host 110 (P320, P330). Upon receiving the unlearning request, source host 110 updates or deletes route information 162 (P340). Depending one implementation, the unlearning request may comprise at least one of an identifier for the virtual network 140, an identifier for a virtual network interface connecting destination node 121 to the virtual network 140, the location of destination host 120 in the network environment 100, or the location of another host in the network environment 100 at which destination node 121 is located. In one implementation, route information 162 is updated if the unlearning request includes the location of the other host and route information 162 is deleted if the unlearning request does not include the location of the other host.

Figure 4:
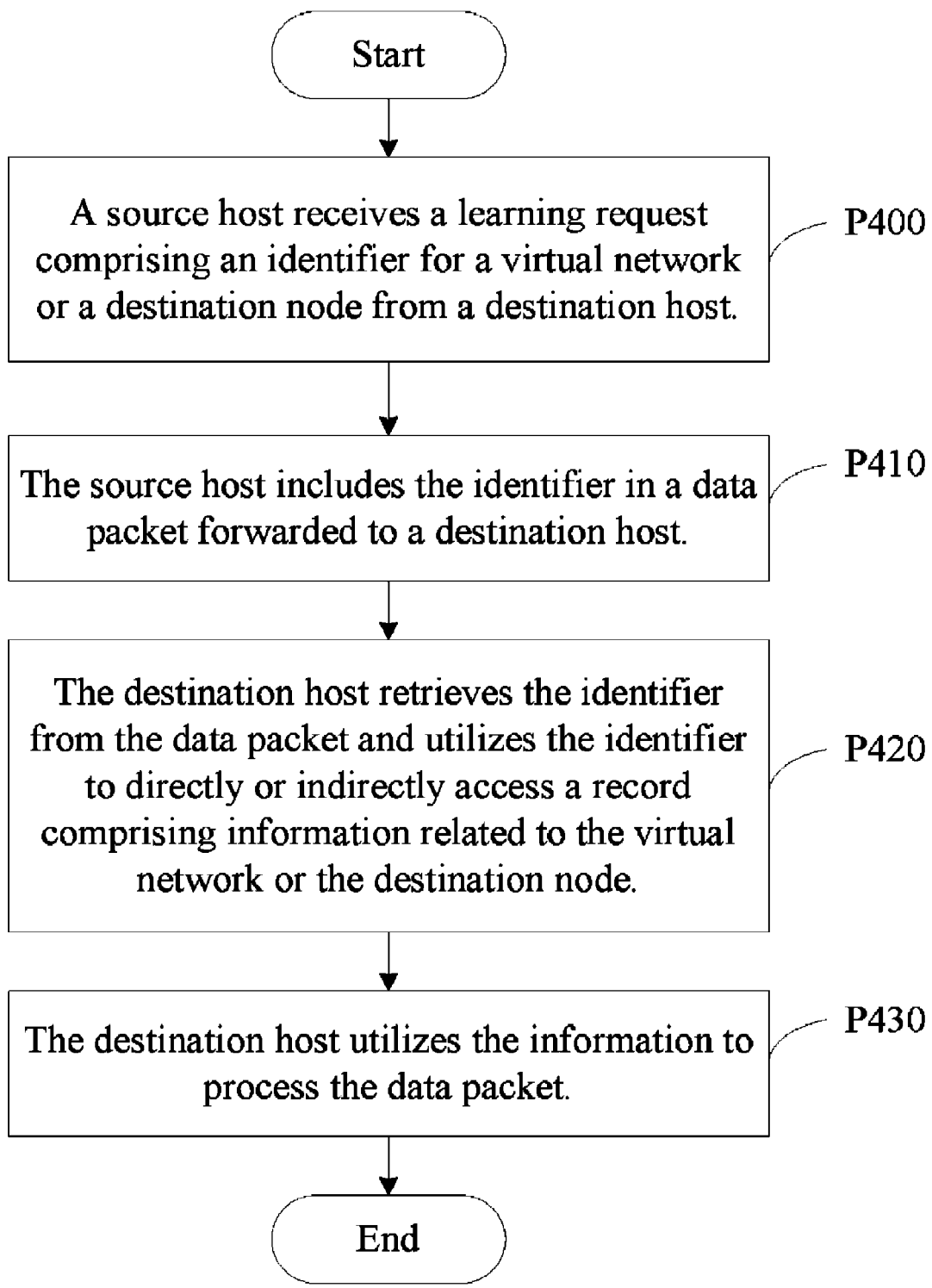
FIG. 4 is a flow diagram of a method for optimizing processing of data by a destination host, in accordance with one embodiment.

Referring to FIGS. 1A, 1B, and 4, in accordance with one embodiment, a destination host may optimize processing of a data packet by using an identifier included in the data packet to access information maintained by the destination host. A collection of information maintained by the destination host may be organized according to one or more categories, each category of information may include one or more records, and each record may be accessed by a different indicator (e.g., a table index, a memory pointer, or any other reference mechanism). Depending on implementation, the records may be implemented using a table, an array, a bitmap, a list, a vector or other memory management mechanism. In sum, a record indicator may be utilized to access a particular record from among one or more records in a category.

In an exemplary embodiment, network information, route information, or multicast information maintained by destination host 120 may be organized according to virtual network or node, depending on implementation. In one implementation, a first record indicator may be utilized to access a record comprising information related to a first virtual network, and a second record indicator may be utilized to access a record comprising information related to a second virtual network. In another implementation, a first record indicator may be utilized to access a record comprising information related to a first node, and a second record indicator may be utilized to access a record comprising information related to a second node.

In some implementations, a mapping mechanism may be utilized to associate an identifier with a record indicator. For example, an identifier for a virtual network may be associated with a record indicator utilized to access a record comprising information related to the virtual network. Or, an identifier for a node may be associated with a record indicator utilized to access a record comprising information related to the node. Thus, information related to a certain virtual network or node may be accessed using an identifier of that virtual network or node. Alternatively, the mapping mechanism may be redundant, and an identifier included in a data packet may be a record indicator itself.

In such an embodiment, source host 110 may receive a learning request including an identifier for the virtual network 140 or destination node 121 from destination host 120 (P400). The identifier may be included in a data packet forwarded to destination host 120 (P410). Upon receiving the data packet, the destination host retrieves the identifier from the data packet and utilizes the identifier to directly or indirectly (e.g., using a mapping mechanism to retrieve a record indicator) access a record comprising information related to the virtual network 140 or destination node 121 (P420). The information included in the record is utilized to process the data packet (e.g., forward the data packet to destination node 121 or another host) (P430).

Advantageously, the processes provided above enable virtual networks and VMs in a virtual network to be addressed independently from their respective host machines such that the virtual networks and the VMs are freely migrateable without regard to the physical address associated with a host machine in a physical network. It is noteworthy that multiple virtual networks may co-exist in a network environment, and the same VM may request connectivity services from multiple virtual networks by way of respective nodes.

Also, the processes provided above enable the creation of scalable private and public virtual networks that are freely migrateable to different network environments such that VMs may interact with host machines connected to physical networks in addition to other VMs. VMs and host machines may interconnect freely by way of interfaces in both virtual and physical networks such that VMs and host machines in a peer-to-peer relationship may communicate without determining whether the machines are VMs or host machines. In other words, a virtual network and a physical network have the same functionality with respect to network traffic.

Figure 5A:
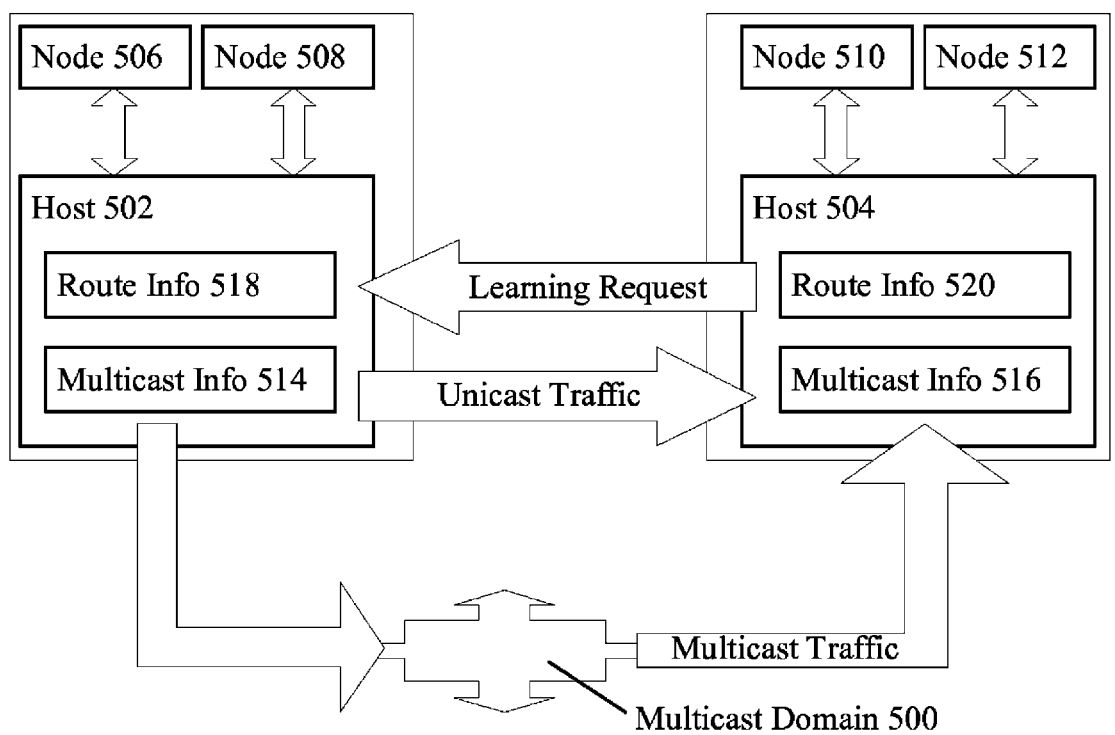
FIGS. 5A and 5B illustrate exemplary implementations of learning and unlearning mechanisms, in accordance with one or more embodiments.
Figure 5B:
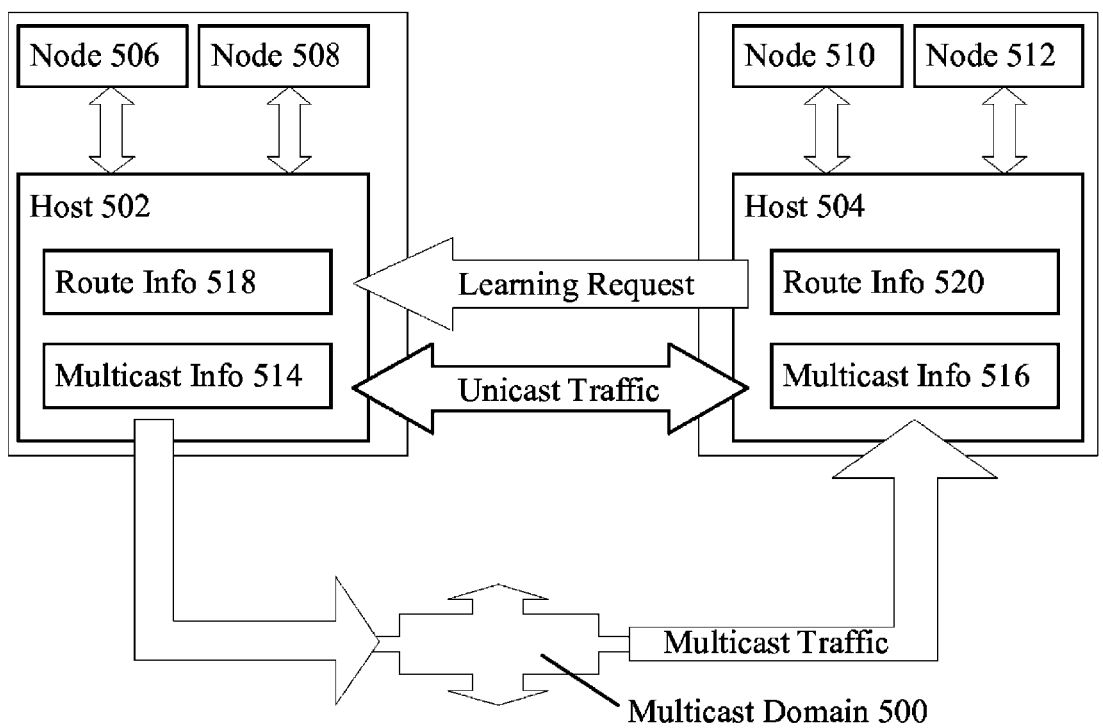

Referring to FIGS. 5A and 5B, in accordance with one or more embodiments, an exemplary implementation of mechanisms for learning and unlearning route information is provided. An external manager (not shown) may construct a multicast domain 500 shared by one or more hosts in a network environment (e.g., hosts 502, 504) such that any host may multicast traffic either directly or by way of one or more other hosts. A host refers to a physical device (i.e., host machine) that implements forwarding for traffic (i.e., data packets) between nodes (e.g., nodes 506, 508, 510, 512).

The multicast domain 500 may be constructed by defining, for each ingress (i.e., incoming traffic) port of a host, multicast information (e.g., multicast information 514, 516) indicating which of the host's egress (i.e., outgoing traffic) ports are to receive a copy of the traffic. For example, if the network environment is a network that supports internet protocol (IP) multicasts, each host may be configured such that any traffic coming from a local node is copied to the IP network and forwarded to a specific IP multicast address as well as to the egress ports of other local nodes. Thus, traffic coming from the IP network ingress ports utilizing the multicast address is copied to each local node. Depending on implementation, in certain embodiments, a broadcast service may be used.

In one embodiment, specific multicast information may exist at each host such that the multicast information is maintained by each of the hosts to collectively form the multicast domain 500. Any change in the location of the hosts or the addition or deletion of hosts from the network environment may require that the multicast information be updated at some or each of the hosts, depending on the manner in which the multicast domain 500 is constructed.

Once the multicast domain 500 is constructed between the hosts, the multicast domain 500 may be utilized to forward broadcast or multicast traffic between nodes or to allow hosts to query the ad-hoc location of nodes. Traffic forwarded by a source node (e.g., node 506) may comprise the address of the destination node (e.g., node 510). Hosts may maintain route information (e.g., route information 518, 520) associating the address of a destination node with the address of a corresponding host.

When a host (e.g., host 502) forwards traffic to a destination node (e.g., node 510), the host determines whether route information for the destination node (e.g., route information 518) is available. If the route information is not available, the host multicasts the traffic to each of the other hosts in the network environment. When the traffic reaches a host corresponding to the destination node (e.g., host 504), the host may respond with a learning signal to the source host. The source host would use the learning signal to generate the route information to the destination node.

In certain embodiments, information associating each node with a virtual network may also be maintained. Depending on implementation, such network information may be maintained by a host corresponding to the node or by the external manager. It is noteworthy that VMs with two or more nodes may be configured as virtual routers between the virtual networks and forward traffic between the virtual networks. A host corresponding to the virtual router may maintain route information for the nodes in the virtual networks, allowing the virtual router to be freely migrateable to a different host machine.

The learning mechanism provided above may be implemented according to a one-way or two-way implementation. In the one-way implementation, a source host that does not have route information to the destination node will multicast the traffic. Upon receiving of a learning signal, the source host generates route information for the destination node. A source host that does have a route information to the destination node will unicast the traffic, as shown in FIG. 5A. Unicast refers to a communication protocol for forwarding traffic to a single destination in a network.

In the two-way implementation, both the host corresponding to the destination node and the source host generate route information, as shown in FIG. 5B. The source host generates route information for the destination node according to the learning signal as in the case of a one-way implementation, and the host corresponding to the destination node generates route information for the source node according to the multicast traffic. In such an implementation, unicast traffic may be forwarded from the source host to the host corresponding to the destination node and vice versa, as shown in FIG. 5B.

Route information may be deleted once a host determines that the route information is obsolete or incorrect. In one implementation, if a host (e.g., host 504) receives unicast traffic that should not have arrived from a source host (e.g., host 502), the host may request the source host to delete the route information for the destination node (e.g., route information 518) using an unlearning signal. The host may also request the source host to delete the route information during or after node failure, removal, or migration.

In another implementation, a keep-alive mechanism may be established between each host and hosts referenced in route information maintained by the host. If a referenced host is non-responsive, route information referencing the non-responsive host is deleted.

In different embodiments, the claimed subject matter may be implemented either entirely in the form of hardware or entirely in the form of software, or a combination of both hardware and software elements. For example, a host machine or host may comprise a controlled computing system environment that may be presented largely in terms of hardware components and software code executed to perform processes that achieve the results contemplated by the system of the claimed subject matter.

Figure 6:
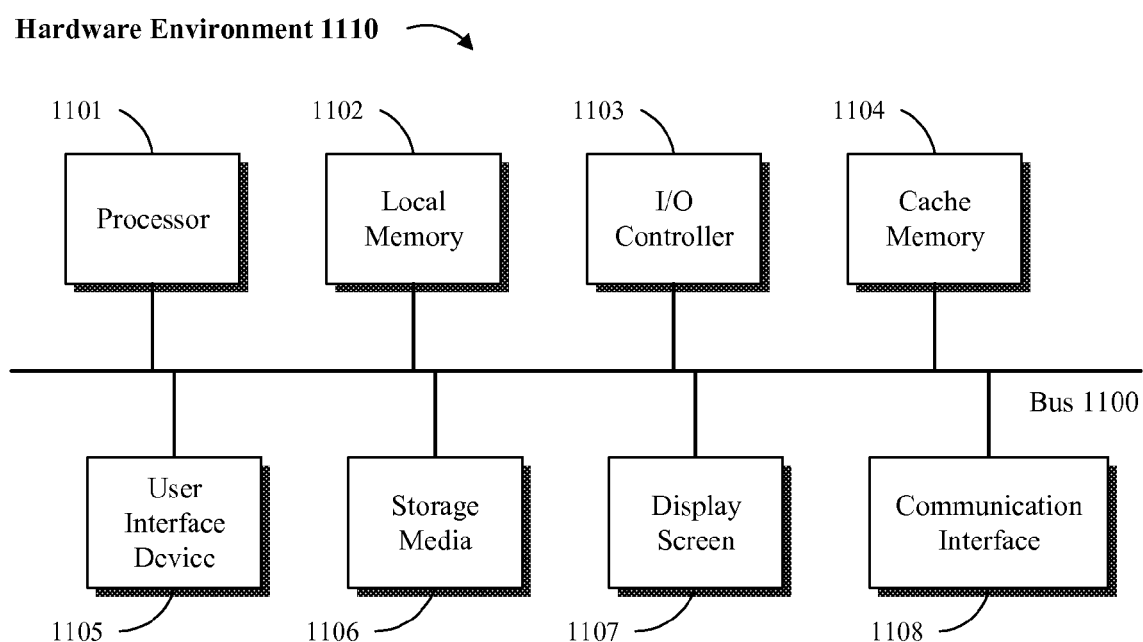
FIGS. 6 and 7 are block diagrams of hardware and software environments in which a system of the present invention may operate, in accordance with one or more embodiments.
Figure 7:
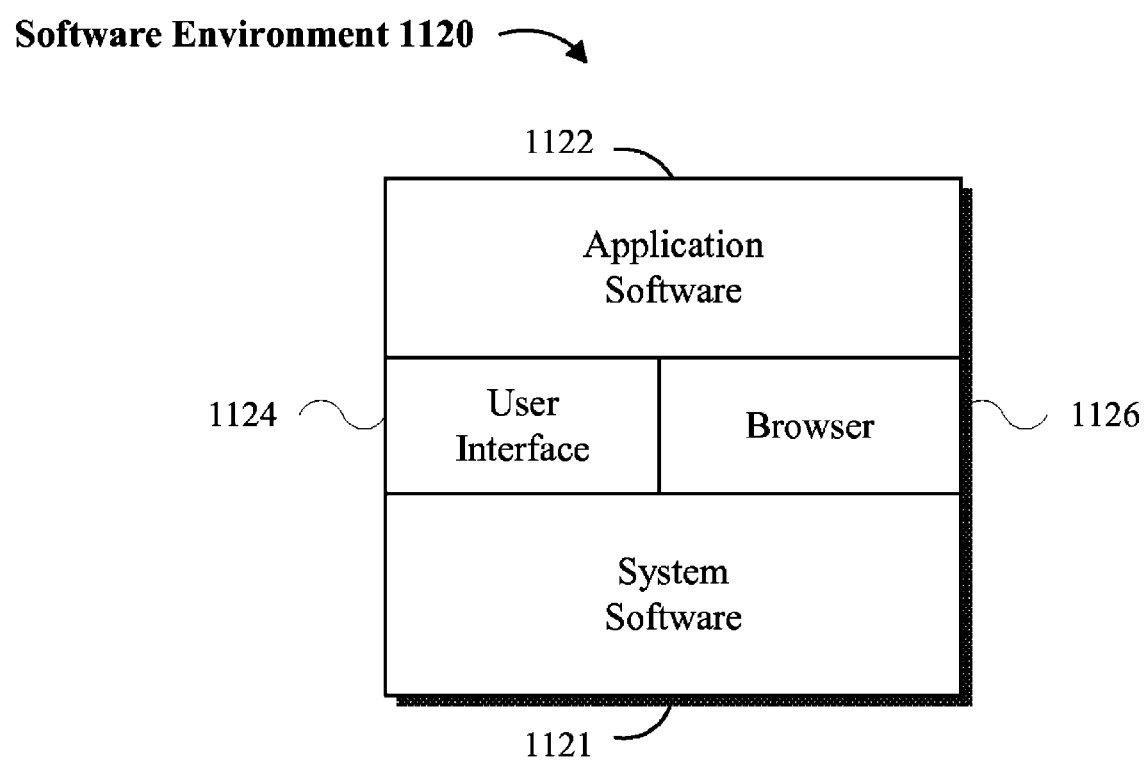

Referring to FIGS. 6 and 7, a computing system environment in accordance with an exemplary embodiment is composed of a hardware environment 1110 and a software environment 1120. The hardware environment 1110 comprises the machinery and equipment that provide an execution environment for the software; and the software environment 1120 provides the execution instructions for the hardware as provided below.

As provided here, software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. In one embodiment, host software may be implemented as system software 1121 or application software 1122 executed on one or more hardware environments to manage communication between nodes in a virtual network.

System software 1121 may comprise control programs, such as the operating system (OS) and information management systems that instruct the hardware how to function and process information. Application software 1122 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 6, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 7, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on a personal computing system (not shown) and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective processes of each method are performed are purely exemplary. Depending on implementation, the processes can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A computer-implemented method for managing communication between nodes in a virtual network, the method comprising:

determining whether first information for forwarding first data from a first node to a second node in a virtual network is available;

wherein said first information comprises routing information for transferring the first data from the first node to the second node, wherein the routing information comprises data that identifies that the second node is hosted at a certain host in the virtual network, without knowledge of physical location of the second node in said virtual network;

utilizing the first information to forward the first data from a first computing system to a second computing system in a physical network, in response to determining that the first information is available;

forwarding the first data to a group of computing systems in the physical network by way of a multicast service, in response to determining that the first information is not available;

receiving a learning request from the second computing system or a third computing system in the physical network, wherein the second computing system or the third computing system forwards the learning request to the first computing system, in response to receiving the first data by way of the multicast service;

utilizing the learning request to generate the first information, in response to receiving the learning request; and receiving an unlearning request from the second computing system or the third computing system in the physical network, wherein the second computing system forwards the unlearning request to the first computing system, in response to determining that the first information is incorrect; and updating or deleting the first information, in response to receiving the unlearning request.

2. The method of claim 1, wherein the first and second nodes are virtual machine interfaces to the virtual network.

3. The method of claim 1, wherein the first information associates the second node with a location of the second computing system in the physical network.

4. The method of claim 1, wherein the multicast service is provided by the first computing system, by one or more other computing systems in the physical network, using a multicast address of the physical network, or a combination thereof.

5. The method of claim 4, wherein the first data is indirectly forwarded to the second computing system or the third computing system by the other computing systems.

6. The method of claim 1, wherein the second computing system generates second information for forwarding second data to the first node, in response to receiving the first data from the first computing system.

7. The method of claim 6, wherein the second information associates the first node with a location of the first computing system in the physical network.

8. The method of claim 1, wherein the learning request comprises at least one of an identifier for the virtual network, an identifier for the second node, or a location of the second computing system in the physical network.

9. The method of claim 1, wherein the first computing system forwards third information for processing the first data to the second computing system with the first data.

10. The method of claim 9, wherein a portion of the third information is provided to the first computing system as part of the learning request.

11. The method of claim 9, wherein the second computing system utilizes the third information to access a first record maintained by the second computing system.

12. The method of claim 11, wherein the second computing system utilizes an identifier included in the third information to obtain an indicator for accessing the first record.

13. The method of claim 12, wherein the identifier is the first record indicator.

14. The method of claim 11, wherein the first record comprises fourth information for processing the first data.

15. The method of claim 14, wherein the second computing system utilizes the fourth information to forward the first data to the second node.

16. The method of claim 14, wherein the second computing system utilizes the fourth information to forward the first data to a fourth computing system in the physical network.

17. The method of claim 16, wherein the fourth information associates the second node with a location of the fourth computing system in the physical network.

18. A computer-implemented method for managing communication between nodes in a virtual network, the method comprising:
  determining whether first information for forwarding first data from a first node to a second node in a virtual network is available,
    wherein said first information comprises routing information for transferring the first data from the first node to the second node, wherein the routing information comprises data that identifies that the second node is hosted at a certain host in the virtual network, without knowledge of physical location of the second node in said virtual network; and
  utilizing the first information to forward the first data from a first computing system to a second computing system in a physical network, in response to determining that the first information is available;
  receiving an unlearning request from the second computing system or a third computing system in the physical network, wherein the second computing system forwards the unlearning request to the first computing system, in response to determining that the first information is incorrect; and
  updating or deleting the first information, in response to receiving the unlearning request.

19. The method of claim 18, wherein the first and second nodes are virtual machine interfaces to the virtual network.

20. The method of claim 18, wherein the first information associates the second node with a location of the second computing system in the physical network.

21. The method of claim 18, wherein the unlearning request comprises at least one of an identifier for the virtual network, an identifier for the second node, or a location of the second computing system in the physical network.

22. A system for managing communication between nodes in a virtual network, the system comprising:
  one or more processors for communicating data over a data communications network;
  a logic unit for determining whether first information for forwarding first data from a first node to a second node in a virtual network is available, wherein the first information provides means to determine a communication path between the first node and the second node, wherein said first information comprises routing information for transferring the first data from the first node to the second node, wherein the routing information comprises data that identifies that the second node is hosted at a certain host in the virtual network, without knowledge of physical location of the second node in said virtual network and wherein the communication path is established over a plurality of computing systems in a physical network;
  a logic unit for utilizing the first information to forward the first data from the first computing system to the second computing system in the physical network, in response to determining that the first information is available;
  a logic unit for forwarding the first data to a group of computing systems in the physical network by way of a multicast service, in response to determining that the first information is not available;
  a logic unit for receiving a learning request from the second computing system or a third computing system in the physical network, wherein the second computing system or the third computing system forwards the learning request to the first computing system, in response to receiving the first data by way of the multicast service;
  a logic unit for utilizing the learning request to generate the first information, in response to receiving the learning request;
  a logic unit for receiving an unlearning request from the second computing system, wherein the second computing system forwards the unlearning request to the first computing system, in response to the second computing system determining that the first information is incorrect; and
  a logic unit for utilizing the unlearning request to update or delete the first information, in response to receiving the unlearning request.

23. A computer program product comprising a non-transient computer readable data storage medium having logic code stored thereon, wherein the logic code when executed on a computer causes the computer to:
  determine whether first information for forwarding first data from a first node to a second node in a virtual network is available, wherein the first information provides means to determine a communication path between the first node and the second node, wherein said first information comprises routing information for transferring the first data from the first node to the second node, wherein the routing information comprises data that identifies that the second node is hosted at a certain host in the virtual network, without knowledge of physical location of the second node in said virtual network and wherein the communication path is established over a plurality of computing systems in a physical network;
  utilize the first information to forward the first data from the first computing system to the second computing system in the physical network, in response to determining that the first information is available;
  forward the first data to a group of computing systems in the physical network by way of a multicast service, in response to determining that the first information is not available;
  receive a learning request from the second computing system or a third computing system in the physical network, wherein the second computing system or the third computing system forwards the learning request to the first computing system, in response to receiving the first data by way of the multicast service; and
  utilize the learning request to generate the first information, in response to receiving the learning request,
  receive an unlearning request from the second computing system, wherein the second computing system forwards the unlearning request to the first computing system, in response to determining that the first information is incorrect; and
  utilize the unlearning request to update or delete the first information, in response to receiving the unlearning request.

* * * * *